United States Patent [19]

Schwartz et al.

[11] 4,302,913
[45] Dec. 1, 1981

[54] ROOF STRUCTURE HAVING MEAT RAIL HANGERS

[75] Inventors: Robert B. Schwartz, Grosse Pointe Woods; Frank J. Miller, Warren; Hem R. Vij, Fraser, all of Mich.

[73] Assignee: Freuhauf Corporation, Detroit, Mich.

[21] Appl. No.: 60,774

[22] Filed: Jul. 26, 1979

Related U.S. Application Data

[63] Continuation of Ser. No. 886,993, Mar. 16, 1978, abandoned.

[51] Int. Cl.³ .......................... G09F 7/18; E04B 1/00; E04B 1/38
[52] U.S. Cl. .......................................... 52/39; 52/262; 52/268; 52/710; 52/729
[58] Field of Search .................. 296/24 B; 280/179 R; 151/41.7, 38; 85/1 H; 248/222.3, 73, 228; 52/39, 268, 710, 262, 729, 282, 780, 711, 365, 309.11, 309.8, 309.14, 309.9

[56] References Cited

U.S. PATENT DOCUMENTS

| | | | |
|---|---|---|---|
| 1,502,766 | 7/1924 | Curley | 52/710 X |
| 1,577,193 | 3/1926 | Reed | 85/1 H |
| 2,578,052 | 12/1951 | Evanoff et al. | 52/262 X |
| 2,601,213 | 6/1952 | Poupitch | 85/1 H |
| 2,676,680 | 4/1954 | Kindorf | 52/710 X |
| 2,794,476 | 6/1957 | Hanneman | 151/38 X |
| 2,859,710 | 11/1958 | Elsner | 248/222.3 X |
| 2,962,323 | 11/1960 | McBride | 52/39 X |
| 3,004,636 | 10/1961 | Shane | 52/710 X |
| 3,018,860 | 1/1962 | Johnson | 52/39 X |
| 3,027,187 | 3/1962 | Rivers | 52/262 X |
| 3,122,860 | 3/1964 | Schulze | 52/309.11 |
| 3,123,186 | 3/1964 | Adkinson, Jr. et al. | 52/265 |
| 3,310,923 | 3/1967 | De Ridder | 52/282 X |
| 3,332,170 | 7/1967 | Bangs | 52/309.11 X |
| 3,353,863 | 11/1967 | Koot | 52/262 X |
| 4,156,999 | 6/1979 | Avery | 52/729 |
| 4,159,604 | 7/1979 | Burrell | 52/729 |

FOREIGN PATENT DOCUMENTS

| | | | |
|---|---|---|---|
| 709174 | 5/1965 | Canada | 52/39 |
| 1112265 | 8/1961 | Fed. Rep. of Germany | 248/222.3 |
| 2503722 | 8/1976 | Fed. Rep. of Germany | 52/710 |
| 517916 | 5/1921 | France | 52/39 |
| 77710 | 3/1962 | France | 248/222.3 |
| 265672 | 6/1929 | Italy | 52/710 |
| 650239 | 2/1951 | United Kingdom | 52/710 |
| 922967 | 4/1963 | United Kingdom | 85/1 H |

Primary Examiner—Leslie Braun
Attorney, Agent, or Firm—Ralph J. Skinkiss; William P. Hickey; Ronald W. Wangerow

[57] ABSTRACT

An insulated vehicle body, such as a refrigerated truck or trailer, has load carrying reinforcement beams in the roof structure with bottom slots accessible through openings in the ceiling skin to receive removable hangers that may be used to suspend meat rails or other articles from the roof structure.

10 Claims, 8 Drawing Figures

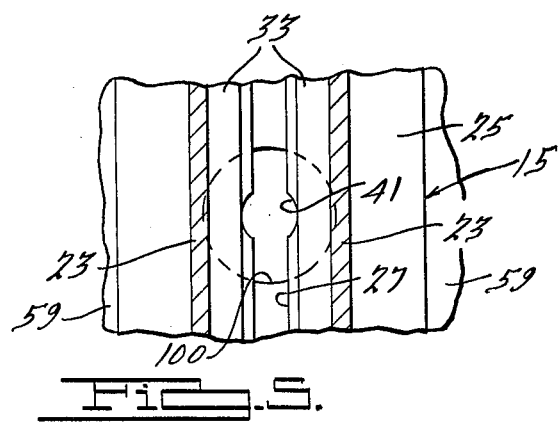
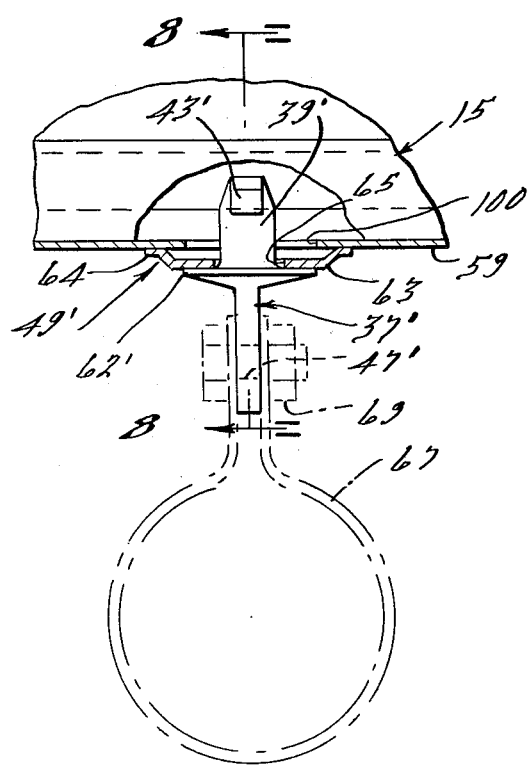
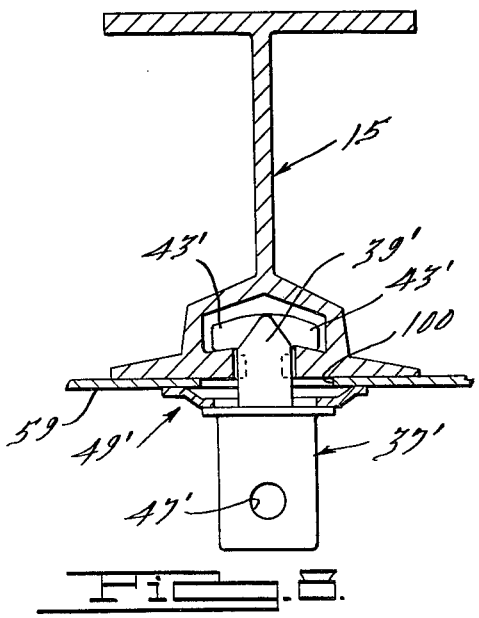

ROOF STRUCTURE HAVING MEAT RAIL HANGERS

This is a continuation, of application Ser. No. 886,993, filed 3-16=78 now abandoned.

BRIEF SUMMARY OF THE INVENTION

In the past it has been customary to suspend meat from rails attached by permanent hangers to the roof structure of a refrigerated vehicle body. The hangers projected into the refrigerated compartment and occupied substantial space near the ceiling of the compartment which was not usable for the storage of many articles that did not need to be suspended from the roof. It is, therefore, the purpose of the present invention to provide a suspension structure which permits the hangers to be easily removed or inserted from the inside of the refrigerated compartment but which does not interfere with the insulation of the compartment.

The invention achieves this purpose by means of a special roof reinforcing beam member that has a wall arrangement which forms a hollow longitudinally extending internal chamber accessible only through a slot in a bottom flange of the beam. This flange has shoulders inside the longitudinal chamber that engage and support transverse arms on hangers which project into the compartment. The hanger arms may be inserted through the slot and then turned 90° so that they rest upon the shoulders, thereby suspending the hangers and parts carried by them from the beam. When it is desired to use the refrigerated compartment to its fullest capacity, i.e. from floor to ceiling, the hangers may be lifted from the beam shoulders, rotated 90°, and then removed downwardly through the slot in the bottom flange.

DESCRIPTION OF THE DRAWINGS

FIG. 5 is a cross section similar to that of FIG. 4 but showing the condition of the beam when the hanger is removed;

FIG. 6 is an enlarged cross section of the resilient grommet that is shown in compressed condition in FIG. 3 but showing it in the relaxed state;

FIG. 7 is a view of the hanger similar to that shown in FIG. 2 but with a metal spring washer utilized in place of the grommet of FIG. 6; and FIG. 8 is a section along the line 8—8 of FIG. 7.

DESCRIPTION OF THE INVENTION

Figure 1:
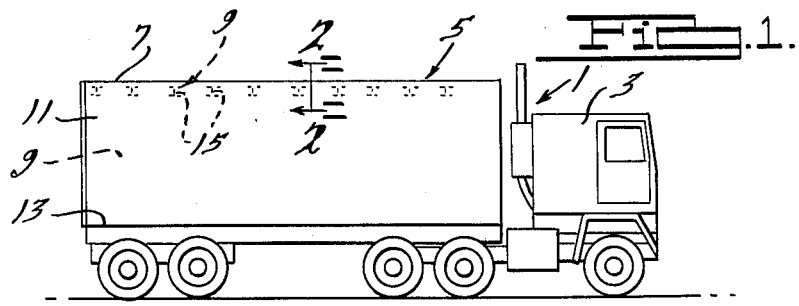
FIG. 1 is a rather schematic side elevation of a truck with a refrigerated trailer having a hanger structure embodying the invention.

A vehicle 1 in the form of a highway truck 3 has a trailer 5 with a body 7 containing a refrigerated compartment 9 that is held at low temperatures by conventional refrigerating equipment (not shown). The body 7 has a heat insulated roof structure 9 as well as heat insulated side walls 11 and floor 13. In accordance with this invention, the roof structure 9 includes a series of horizontal reinforcement beams 15 that extend at right angles to the length of the trailer 5 and are of a special configuration best seen in FIGS. 2 and 3.

Each of the beams 15 is roughly in the form of an I-beam and may be readily manufactured from metal by an extrusion process. The beam 15 includes a vertical web 17 and a top horizontal I-beam flange 19. The bottom part of the beam 15, however, is formed in a special way in accordance with the invention. Thus, the web 17 terminates at the upper end of a pair of transversely extending walls 21 which slope downwardly to merge with substantially vertically extending wall sections 23. The wall sections 23 terminate at the top of the bottom I-beam flange 25. The bottom flange 25 has a longitudinal slot 27 in it that extends, preferably, throughout the full length of the beam 15. Except for the ends (as shown at 29), it forms the only means of access to the chamber 31 that is defined by the wall sections 21, 23, and the shoulder portions 33 of the bottom flange 25 that extend inwardly from the wall sections 23 and terminate in and define the edges of the slot 27. It will be noted that the flange portions 33 are thickest adjacent the slot 27 and tapered as they extend outwardly and that they form shoulders facing upwardly toward the wall sections 21.

The slot 27 in each of the beams 15 is adapted to receive the top end 35 of each of a plurality (not shown) of hangers 37. The top end 35 of each hanger has a cylindrical shank 39 which is slightly larger in diameter than the normal width of the slot 27 but less in diameter than a series of holes or enlargements 41 which center on the midlines of the slots and are drilled into the bottom flange sections 33. At the top end of the hanger shank 39 is a pair of arms 43 extending in opposite directions from the center line of the hanger 37 and having a width which is somewhat less than the width of the slot 27.

The hanger 37 may be mounted on the beam 15 by holding it so that the arms 43 are parallel and in alignment with the slot 27 and the shank 39 in vertical alignment with a hole 41. In this position, the hanger 37 can be moved upwardly until the arms 43 are inside of the chamber 31 and then rotated 90° to the position of FIG. 3 so that the arms 43 overlie and can seat upon the flange portions 33. Preferably, the bottom faces of the arms 43 are slanted on the same angle as the shoulders 33 (they define an included angle which is less than 180°). These sloped mating surfaces of the arms and the flanges will tend to pull the bottom flange sections 33 together when a downward load is applied to hangers and tend to resist motion which would disengage the hangers. For load receiving purposes, the hanger is shown with a plate like bottom portion 45 that has a hole 47 to receive a fastener whereby a load may be supported on the hanger.

Figure 3:
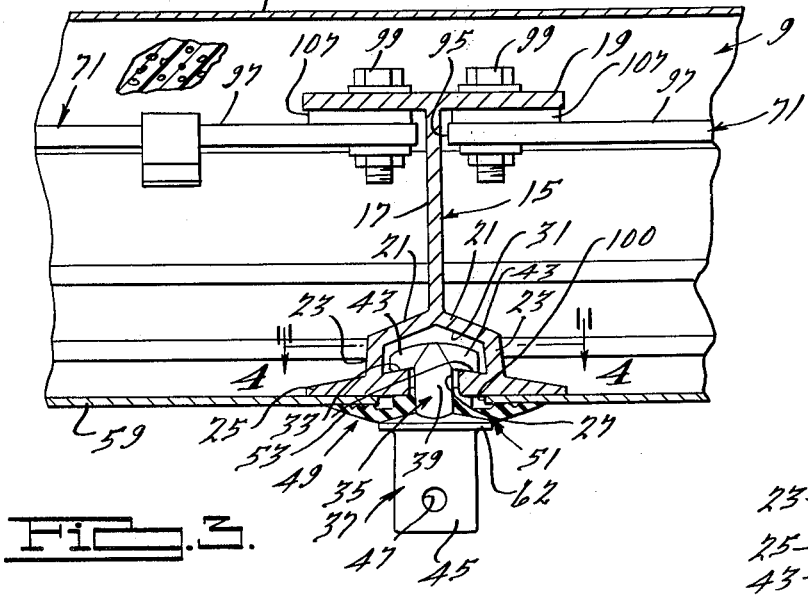
FIG. 3 is a cross section taken along the line 3—3 of FIG. 2 but with the sidewall omitted.
Figure 4:
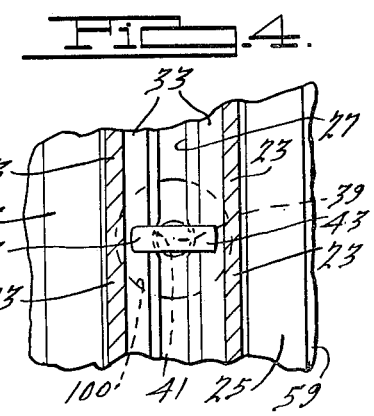
FIG. 4 is a cross section taken along the line 4—4 of FIG. 3.

Preferably, a spring device 49 is used to apply an appropriate downwardly directed preload on the connection between the hanger arms 43 and the flange shoulders 33 to prevent the hanger from inadvertently rotating and falling out of the beam 15 due to vibration, etc. In FIG. 3 the spring device 49 is in the form of an elastic, dish shaped grommet 51 of rubber or the like that has a skirt 53 with an outer edge 55 and interior annular shoulders 57 (FIG. 6) which engage the inner surface of the ceiling skin 59 around hole 100 (FIG. 3) when the grommet is compressed, as it is in FIG. 3. A collar 61 on the grommet receives the shank 39. The hanger 37 has flange 62 with a conical top shoulder engaging the bottom of the grommet 51 to facilitate compression.

FIGS. 7 and 8 show a different device 49' in the form of a dished metal spring washer 63 having a flange 64 that engages the ceiling skin 59. The hanger 37' has a flange 62' with a flat top shoulder that presses against the flat bottom face of the washer 63. Compression of the washer 63 is required before the hanger 37' can be rotated a quarter turn to rest on the shoulders 33. The height of the washer is such that compression is maintained after the arms 43' are seated on the shoulders to snugly hold them in place. The washer 63 has a central opening 65 through which the shank 39 of the hanger extends and corresponds to the inner diameter 61' of the grommet collar 61. The openings 65 and 61' can be manuvered over the arms 43 to slip down on the hanger shank prior to mounting of the hanger on the beam 15.

FIG. 7 also shows, in phantom lines, a typical meat rail support strap 67 connected by fastener 69 that extends through hole 47' in the hanger 37' to apply a gravity load to the hanger. The member 67 illustrates that a load may be connected to only one hanger or to a series of hangers, depending upon the internal suspension system that it is desired to use in the compartment 9.

Figure 2:
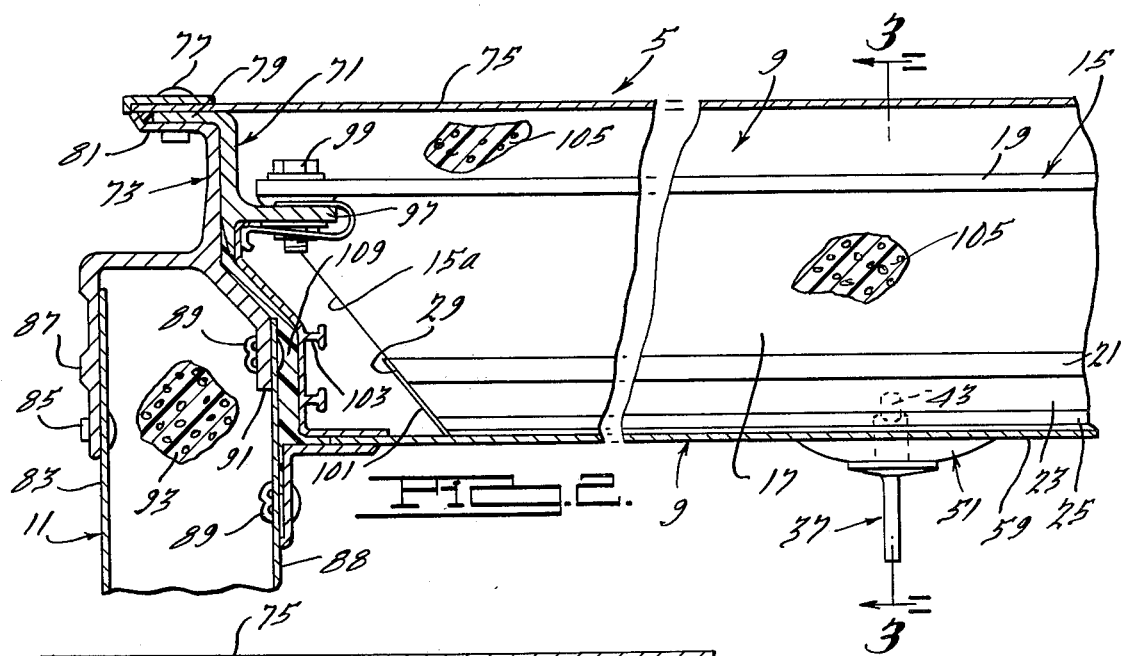
FIG. 2 is an enlarged cross section, broken away, taken along the line 2—2 of FIG. 1.

FIGS. 2 and 3 illustrate one way in which beam 15 may be incorporated into the roof structure 9. In this arrangement the roof structure includes nested inner and outer longitudinal load carrying top rails 71 and 73, respectively, which are bolted or riveted together. The roof skin 75 is secured at various points 77 to outwardly extending, horizontal flanges 79 and 81 on the rails. The bottom of the outer rail 73 is formed to have inner and outer legs which act with sidewall skins to define the sidewalls 11. The outer sidewall skin 83 is secured at various points 85 to the outer leg 87, and the inside sidewall skin 88 is secured at various points 89 to the inner leg 91. The space between the two skins is filled with heat insulation material 93. The Z-shaped top inner rails 71 are separated at regular longitudinally separated locations as seen at 95 (FIG. 3) so that the webs 17 of transverse beams 15 can fit between them and the top flanges 19 overlie the horizontal flanges 97 on the Z-shaped rails 71. The beam flanges 19 are rigidly secured to the rail flanges 97 by fasteners 99. Gravity loads on the beams are therefore transmitted into the top rails 71 and 73. At the same time, since the beams 15 extend crosswise of the trailer 5 between nested rails 71 and 73 on opposite sides of the trailer, they provide transverse reinforcement to the roof structures as well as the sidewalls 11. The ceiling skin 59 is secured at various points (not shown) to the bottom flanges 25 of beams 15 and may, if desired, be rigidly secured to them and therefore serve as a load carrying member of the roof structure. Holes 100 in the skin 59 are aligned with beam flange holes 41 but are closed off by grommets 49 or washers 49'.

As illustrated in FIG. 2, the ends 15a of the beams 15 are formed on an angle of about 60° to the horizontal so that the bottom flanges 25 are shorter in length than the top flanges 19. Each end 29 of the chamber 31 in each beam is closed by covering it over with adhesive paper as shown at 101. Thus, the chamber 31 is sealed off from the space between the roof skin 75 and ceiling skin 59 (on the top and bottom) and between the combination of Z-shaped top rails 71 and foam dam 103 (on opposite sides). This roof space is, accordingly, entirely sealed off from the inside or the outside of the trailer 5, as well as from the beam chambers 31. It is, therefore, adapted to have the insulative material 105 formed by an in situ foaming process to fill the empty roof space surrounding the beams 15. The slanted end 15a of the beam adjacent the foam dam 103 will fill up with insulative material to insulate the beam from the dam, insulating pads 107 between the beams 15 and rail flanges 97 to minimize heat conduction at these joints, and insulative material 109 between the dam 103 and skin 88 and rail leg 91 further minimizes conduction losses. The chambers 31 inside of beams 15 are, as already mentioned, sealed off at the ends by tape 101 and at those holes 41 which contain hangers by the washer means 49 or 49'. Any remaining holes 41 connect the chambers 31 with the compartment 9.

Thus, the invention provides a roof suspension system featuring special reinforcement beams 15 that extend across the compartment 9 and have chamber forming means at their bottom ends which receive support arms 43 on a plurality of hangers 37 that individually or collectively serve to suspend a load 67 from the roof structure. In the case of use to suspend heavy meat carcasses which normally would have a tendency to sway, it will be observed that the slanted arms 43 tend to provide stability and the edges of the holes 41 by engagement with shanks 39 prevent the hangers from sliding along the lengths of the slots 27. Modifications may be made in the specific details illustrated without departing from the spirit and scope of the invention.

We claim:

1. A roof structure for a vehicle having at least two spaced apart sidewalls, defining an interior space therebetween, each of which has a top ledge, comprising: a longitudinally extending Z-shaped rail, one leg of which extends outwardly over said top ledge, the other leg of which extends inwardly of the sidewall, a plurality of spaced apart transverse beams each having a top flange, the end of which is fastened to rail inwardly extending leg of said Z-shaped rail, whereby said beam top flanges lie in a plane below the sidewall top ledges, said transverse beams each having oppositely extending spaced apart bottom flanges forming the bottom wall of a chamber having an access slot formed by the space between the flanges and spaced apart upwardly facing shoulders formed by the top face of said oppositely extending flanges, said access slot having spaced apart enlargements of generally predetermined cross section, individual hangers in said individual enlargements, said hangers having a shank portion of a width greater than that of said slot, a head portion of a width less than said slot, and a bottom portion outwardly of said slot having a load attachment surface thereof, whereby the roof structure can be pre-assembled and lowered onto the top ledge.

2. The roof structure of claim 1 including a roof skin spaced above said transverse beams and fastened to said outwardly-extending leg of said Z-shaped rail.

3. The roof structure of claim 1 including a ceiling plate positioned against the bottom of said transverse beams, said ceiling plate having individual openings therethrough which receive said individual hangers, spring retaining means between said individual hangers and said ceiling plate biasing the heads of said hangers down onto said upwardly facing shoulders of said bottom flanges thereby biasing said ceiling plate against said transverse beams.

4. The roof structure of claim 3 wherein said hangers have flanges between their shank and bottom portions, and said spring retaining means includes rubber grommets which form a seal between said ceiling plate and said flanges.

5. The roof structure of claim 3 including a foam dam extending from said Z-shaped rail to said ceiling plate, and whereby the assembly can be filled with insulation before lowering onto said top ledge.

6. A roof structure for containers having sidewalls each of which have a top generally channel shaped rail with upper and lower outstanding legs connected by a web having an inside generally vertical face, comprising: a pair of spaced apart opposite hand generally Z-shaped stringers having their top horizontal legs extending outwardly to sit on the upper legs of the sidewall rails and with their lower horizontal legs extending inwardly toward each other, spaced apart transverse beams having top and bottom flanges and a web therebetween extending between said Z-shaped stringers with opposite ends of their top flanges being secured to the respective lower horizontal legs of said stringers, a roof skin having opposite side edges resting on top of said top horizontal legs of said Z-shaped stringers, and insulation means between said transverse beams and said roof skin to support said roof skin, and whereby the roof structure can be preassembled and lowered onto the upper legs of the sidewall rails to be secured thereto.

7. The roof structure of claim 6 including: a ceiling skin held against the bottom of said transverse beams, and means insulating both sides and ends of said transverse beams.

8. The roof structure of claim 7 including: insulation dams closing the side spaces between said ceiling skin and respective Z-shaped stringers.

9. The roof structure of claim 6 including: depending legs on said Z-shaped stringers for abutting the respective webs of the sidewall rails opposite the lower outstanding legs of the rails.

10. The roof structure of claim 9 including: a ceiling skin held against the bottom of said transverse beams, means insulating both sides and ends of said transverse beams, and insulation dams closing the side spaces between said ceiling skin and respective Z-shaped stringers.

* * * * *